E. G. COX.
BELT TRACTOR ATTACHMENT FOR MOTOR VEHICLES.
APPLICATION FILED MAY 14, 1917. RENEWED JAN. 8, 1920.
1,413,100.
Patented Apr. 18, 1922.
3 SHEETS—SHEET 1.
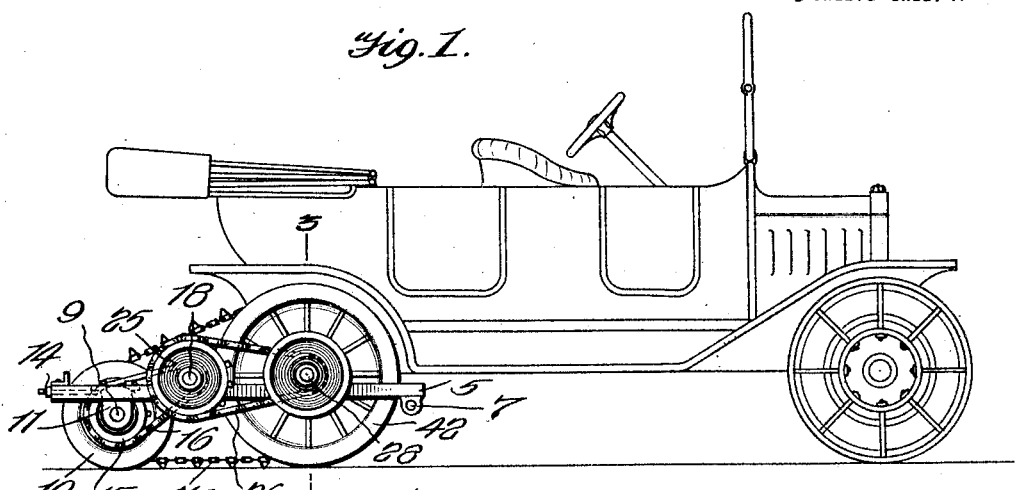
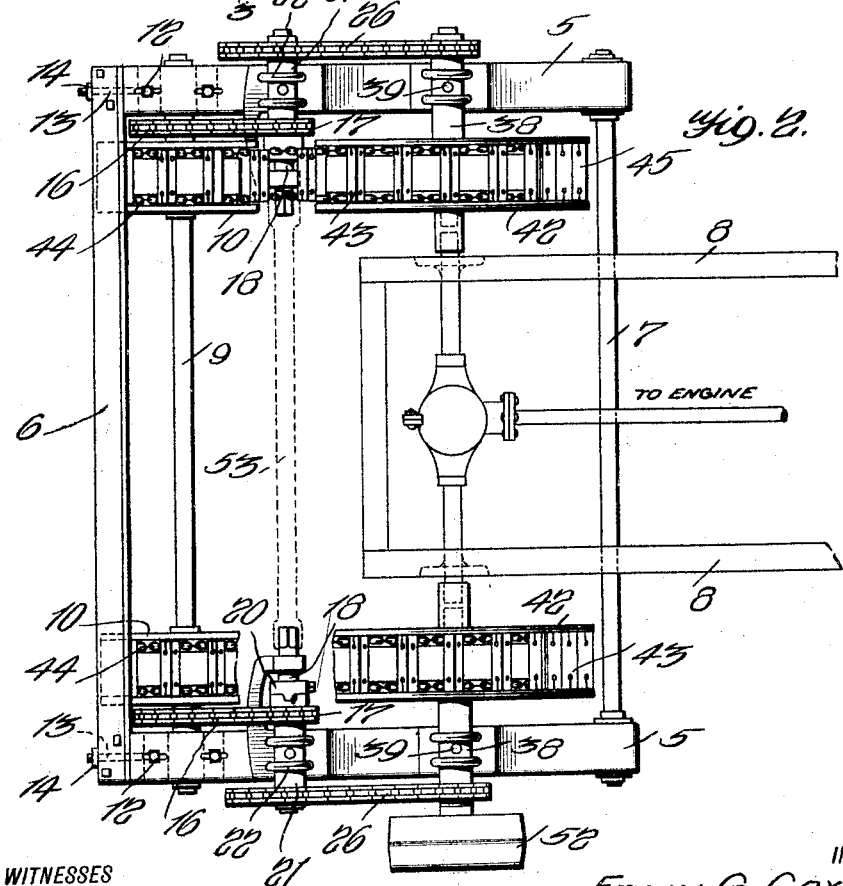
WITNESSES
INVENTOR
EDWIN G. COX,
BY
ATTORNEYS E. G. COX.
BELT TRACTOR ATTACHMENT FOR MOTOR VEHICLES.
APPLICATION FILED MAY 14, 1917. RENEWED JAN. 8, 1920.
1,413,100.
Patented Apr. 18, 1922.
3 SHEETS—SHEET 2.
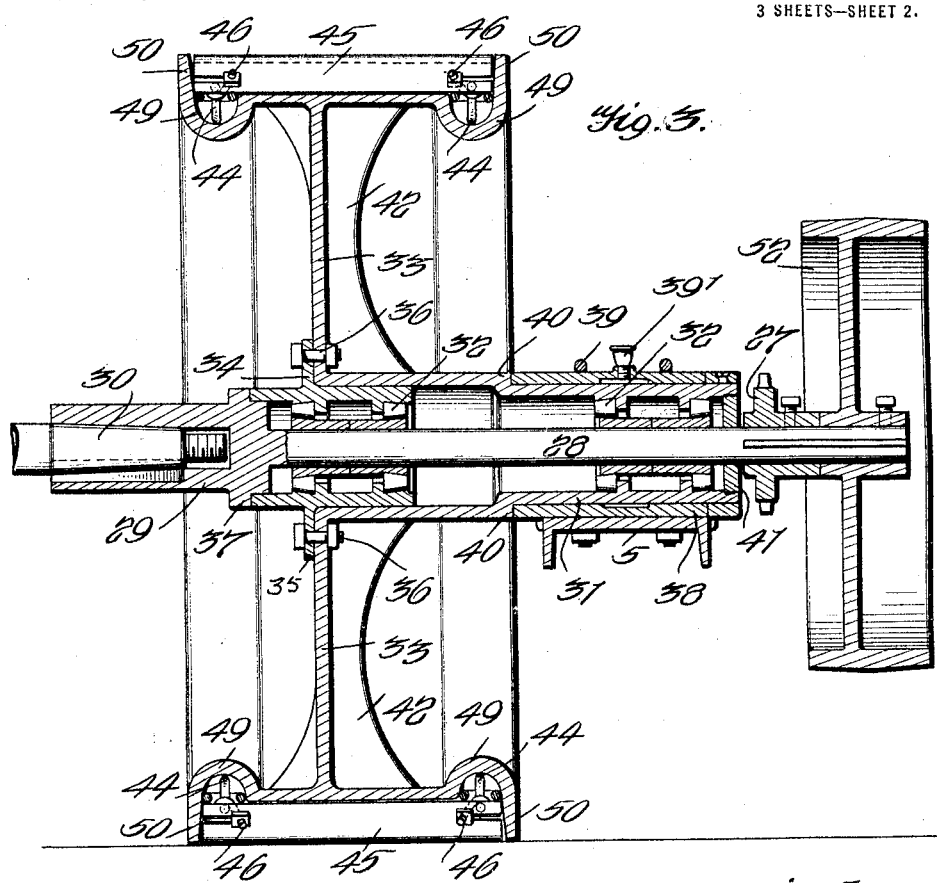
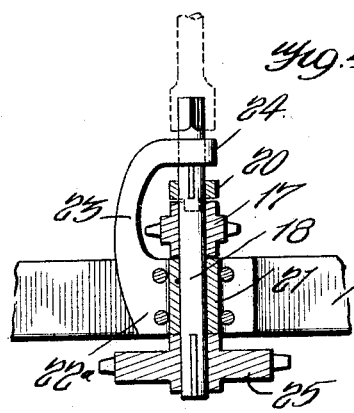
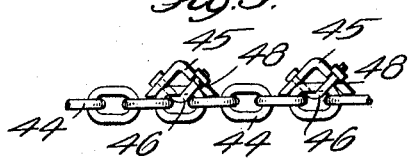
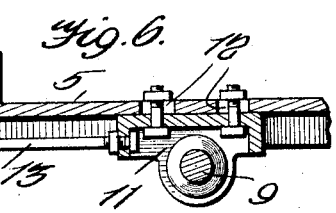
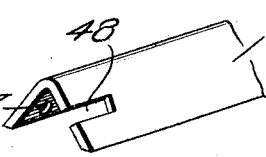
WITNESSES
INVENTOR
EDWIN G. COX,
BY
ATTORNEYS

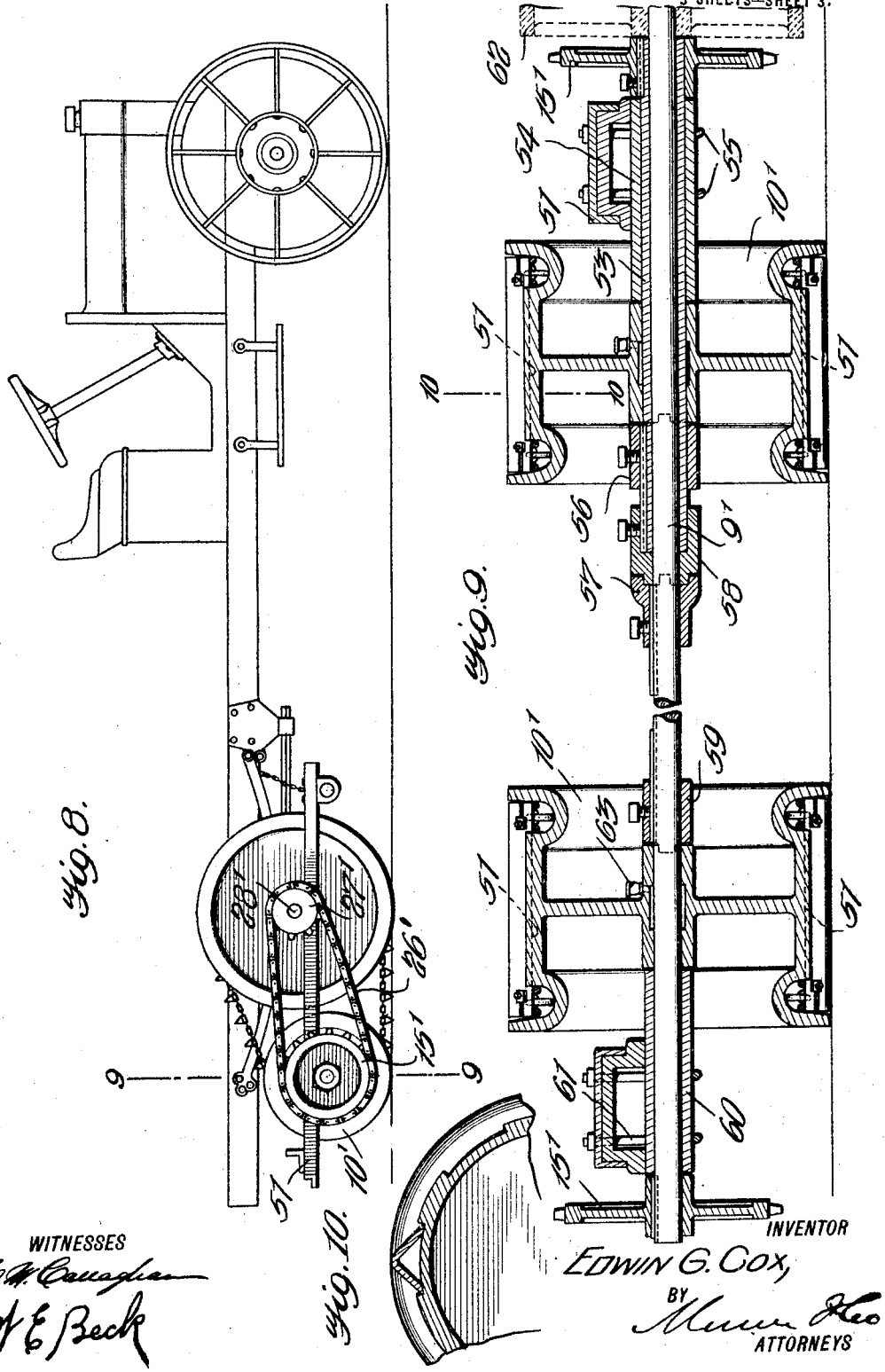

UNITED STATES PATENT OFFICE.

EDWIN G. COX, OF WALLA WALLA, WASHINGTON, ASSIGNOR TO THE E. G. COX MANUFACTURING COMPANY, OF OAKLAND, CALIFORNIA, A CORPORATION OF CALIFORNIA.

BELT-TRACTOR ATTACHMENT FOR MOTOR VEHICLES.

1,413,100.   Specification of Letters Patent.   Patented Apr. 18, 1922.

Application filed May 14, 1917, Serial No. 168,545. Renewed January 8, 1920. Serial No. 350,245.

*To all whom it may concern:*

Be it known that I, EDWIN G. COX, a citizen of the United States, and a resident of Walla Walla, in the county of Walla Walla and State of Washington, have invented a certain new and useful Improvement in Belt-Tractor Attachments for Motor Vehicles, of which the following is a specification.

The principal object of my present invention is to provide a tractor attachment for automobiles and auto trucks having an improved method of drive direct from the rear axle of the machine to which the tractor is attached.

Another object of the invention is to provide a tractor attachment for motor vehicles incorporating an improved arrangement whereby the motor vehicle may be used as a power plant for stationary work.

With these and other objects in view which will become apparent as the description proceeds, the invention resides in the construction, combination, and arrangement of parts hereinafter more fully described and claimed, and illustrated in the accompanying drawings in which like characters of reference indicate like parts throughout the several figures, of which—

Figure 1 represents a view in elevation of an automobile equipped with a tractor attachment constructed according to my invention;

Figure 2 represents a top plan view of the rear portion of the chassis of the automobile, the tractor attachment being shown in place thereon;

Figure 3 represents a view in section taken vertically on the plane indicated by the line 3—3 of Figure 1, the parts being enlarged.

Figure 4 represents a plan view partially in section of one of the jacket shafts and adjacent parts, showing the clutch whereby the smaller sprocket may be coupled with and uncoupled from the jack shaft;

Figure 5 represents a fragmentary view in elevation of the tractor chain or belt;

Figure 6 represents a view in section taken longitudinally through one of the side beams adjacent the rear end thereof, showing the adjustable bearing for the rear axle of the tractor;

Figure 7 represents a fragmentary view in perspective of one of the angle irons used on the tractor belt;

Figure 8 represents a view in elevation of an auto truck equipped with a tractor attachment constructed according to my invention;

Figure 9 represents an enlarged view in section taken transversely of the truck attachment, along the rear axle thereof, on the plane indicated by the line 9—9 of Figure 8;

Figure 10 represents a fragmentary sectional view of one of the rear drive wheels taken on the plane indicated by the line 10—10 of Figure 9.

Referring more particularly to the drawings, the frame of the automobile tractor attachment, shown in Figures 1 to 6 inclusive, includes the side beams 5, preferably made of suitable channel iron, connected together at their rear ends by the cross piece 6, and at their front ends by the cross bar 7. The tractor attachment frame is greater in width than the body frame 8 of the automobile, as clearly shown in Figure 2. The cross bar 7 extends under the frame 8, and is also preferably arranged below the side beams 5.

Arranged transversely of the tractor frame adjacent its rear end, is an axle 9 on which the smaller rear wheels, hereinafter termed the drive wheels 10, are journaled. This axle at its ends is suitably mounted in the adjustable bearings 11. These bearings, as shown in Figure 6, are slidable longitudinally within the side beams 5, being adjustably secured thereto by means of the bolt and slot connections 12. An adjusting screw or bolt 13 is connected at its forward end to each of the adjustable bearings 11, and at its rear end passes through an opening in the down turned rear end of the side beam, as clearly shown, and is equipped with nuts 14 whereby it may be adjusted for adjusting the bearing 11, and may be locked in adjusted position. It will be understood of course that each of the bearings 11 is equipped with the adjusting means just described.

Each of the drive wheels 10 is equipped on its outside with a sprocket 15. These sprockets are driven by chains 16 from smaller sprocket wheels 17 mounted on the jack shaft 18. The sprockets 17 may be connected for rotation with the jack shaft 18, or may be disconnected from the jack shaft 18 through the operation of suitable clutches indicated at 20. When the clutches are in the position indicated in Figures 2 and 4, the sprockets 17 will be driven as the jack shafts are driven. When, however, these clutches 20 are loosened and moved away from the sprockets 17, the jack shafts are free to rotate without driving the sprockets 17.

Each of the jack shafts 18 is rotatably mounted in a sleeve or bearing 21 fixed by means of suitable U-shaped clips 22 on top of the side beams 5, as clearly shown. The sleeves or bearings 21 are formed integrally with or mounted upon plates 22ᵃ which have inwardly extending arms 23 terminating in bearings 24 in which the inner ends of the jack shafts 18 are journaled as clearly shown. On the outer end of each of the jack shafts is keyed a larger sprocket 25, and these sprockets are preferably arranged on the outer sides of the beams 5, the smaller sprockets 17 being arranged on the inner sides thereof. The sprockets 25 are driven by means of endless chains 26 from sprockets 27, mounted, as shown in Figure 3, adjacent the outer ends of the stub axle 28.

Each of the stub axles, at its inner end, is provided with a socket 29 adapted to be keyed onto the spindle 30 of one of the segments of the drive axle of the automobile to which the tractor attachment is to be applied, after the drive wheel of the automobile has been removed. This arrangement is shown in Figure 3. Mounted for rotation upon and relatively to each of the stub axles 28, is a sleeve 31, which is somewhat greater in internal diameter than the diameter of the stub axle, and between which sleeve and the stub axle are interposed suitable bearings 32 of desired type. These sleeves at their inner ends are formed integrally with or suitably secured to the web portion 33 of what may be termed the larger or main wheel of the tractor attachment. In the construction shown in Figure 3, the tubular hubs 34 of the larger wheels are secured by flanges 35 and bolts 36 to the inner ends of the sleeves 31, such hubs being mounted for rotation upon the anti-friction bearings 32 interposed between the hubs and the stub axles 28. The inner ends of hubs 34 may bear against the annular shoulders 37 defined by flanges formed at the outer ends of the sockets 29 on the stub axles. These sleeves 31 are each rotatably mounted within a tubular bearing 38, such bearings being secured by means of U-bolts or clips 39 upon the side beams 5 of the attachment, as shown clearly in Figure 2. The bearing tubes 38 may be interiorly grooved and equipped with oil cups 39', or such other suitable method of lubricating the bearing may be employed as desired. The sleeve, in each instance, adjacent the inner end of its bearing 38, is formed with a shoulder 40 which limits the outward movement of the sleeve relatively to the bearing. Closures 41 screwed or otherwise suitably secured in the sleeves 31 at their outer ends, serve to enclose the sleeves and prevent entrance of foreign matter to the bearings 32. The sprockets 27 for driving the chains 26, are keyed upon the stub axles 28 preferably just outside of the closures 41 at the ends of the sleeves 31.

Over each of the drive wheels 10 and its corresponding larger or main wheel 42, runs an endless tractor belt indicated generally by the numeral 43. This belt in each instance, is formed of a pair of endless link chains 44 connected at intervals by transversely extending substantially V-shaped angle irons 45, as clearly shown in Figure 5. These angle irons are arranged at suitable intervals apart, and are secured to the proper links of chain 44 through the medium of suitable U-bolts 46. At each end the angle irons are provided on one side with an opening 47 through which the shank of the bolt is extended, and on its opposite side with a slot 48, as indicated in Figure 7, into which the end of the U-bolt, after being engaged through the links, is forced. The nut with which the free end of the bolt is equipped is then turned down against the angle iron for securing the bolt in place.

The angle irons are arranged of course on the outside of the tractor belt to afford a positive grip against the surface of the roadway over which the vehicle is travelling. The tractor belts are of a width substantially equal to the width of the wheels 10 and 42, and these wheels are equipped with the annular channel or groove members 49 within which the chains 44 run as shown in Figure 3. The edges of the angle irons 45 are thus free to bear against the peripheries of the wheels 10 and 42. In order that the wheels will roll smoothly over hard roadways, the channels 49 of the wheels at their outer sides are extended to form flanges 50 which at their edges are adapted to bear against the roadway. The edges of these flanges lie substantially flush with the apices of the angle irons 45, so that a smooth tread surface for the wheels is thus provided. At the same time, in softer ground the flanges 50 will sink, and the angle irons will come into play to provide a positive drive and positive grip for the tractor belts.

In operation ordinarily the clutches 20 are in position to lock the sprockets 17 with the jackshafts 18. The drive is then delivered from the rear axle segments of the automobile, to the stub axles 28 and sprockets 27, thence through the medium of the chains 26 to the larger sprockets 25 whereby to drive the jack shafts 18. These shafts rotate the sprockets 17 and the latter drive the chains 16 which in turn drive the wheels 10. The latter transmit the motion to the tractor belts 43 whereby to impart a positive motion to the vehicle. The belts 43 run over and rotate the larger wheels 42, and these wheels rotate idly relatively to the stub axle 28. The sprockets 27 preferably are smaller than sprockets 25, and the sprockets 17 smaller than sprockets 15, so that a double reduction in speed occurs in the transmission of power from the stub axles to the drive wheels 10. In order that a positive transmission of power will be delivered to the tractor belts from the drive wheels 10, the latter as shown in Figure 10, are provided with transversely extending channels or grooves 51 in which the angle irons 45 engage as they travel around the drive wheels.

In order that the attachment may be used in stationary work, one of the stub axles as shown in Figure 3, is provided with an extension on which a drive pulley 52 may be keyed. From this pulley a belt, not shown, for doing the work required may be driven. When stationary work is to be done, the clutches 20 are shifted whereby to unlock the sprockets 17 from the jack shafts, and then a tumbling rod indicated in dotted lines at 53, which rod may be of suitable construction, is coupled to the inner squared ends of the jack shafts in order to effect a unity of movement between the shafts. Thus, power will be transmitted from the stub axle to both jack shafts, but will not be delivered to the drive wheels 10. By providing the tumbling rod connection between the jack shafts, the power from both of the rear axle segments of the automobile may be used in driving the pulley 52.

In the attachment designed particularly for use in connection with auto trucks, as indicated in Figures 8 and 9, the structure is substantially the same with the exception that there is but one reduction in speed between the stub axles indicated at 28' and the drive wheels 10'. The power is transmitted from the stub axles to the drive wheels through the medium of an endless chain 26' which runs over a smaller sprocket 27' mounted on the axle 28', and over a larger sprocket 15' from which the power is delivered to the drive wheel. In the truck attachment, the rear axle construction and the manner of mounting and driving the drive wheels 10', differs somewhat from the arrangement used in the tractor attachment shown in Figures 1 and 2. Rotatably mounted on one end of the rear axle 9' of the truck attachment is a sleeve 53, and this sleeve is journaled for rotation in a cylindrical bearing 54, secured by means of suitable U-shaped bolts or clips 55 to the side bar 51 beneath the same. This sleeve 53 has one of the drive sprockets 15' keyed thereon, and upon the sleeve is rotatably mounted one of the drive wheels 10', such wheel being adapted to be coupled to and uncoupled from the sleeve 53 through the medium of a clutch shown at 56. The sleeve in turn may be coupled to the axle 9' for rotation therewith, or may be uncoupled from the axle through the operation of a second clutch 57. As shown, this clutch is mounted for longitudinal adjustment on the shaft 9', and may be brought into and out of locking engagement with a cap 58 fixed on the sleeve 53 as shown in Figure 9. The other drive wheel 10' is rotatably mounted directly upon the axle 9', and may be coupled for rotation therewith or uncoupled therefrom, through the medium of a third clutch 59. The other end of the axle 9' from that on which the sleeve 53 is mounted, is rotatably journaled in a bearing 60 secured by means of clips 61 to the other side beam, and the remaining drive sprocket 15' is keyed directly onto this end of the axle 9'.

Ordinarily, while running, the drive wheel 10' which is mounted directly on the axle 9', is coupled with said axle through the medium of the clutch 59 so as to be positively driven from the axle. The other wheel is locked with the sleeve 53 to be driven from the sleeve, it being remembered that this sleeve is driven positively from one of the sprockets 15'. The sleeve is, however, uncoupled from the axle 9', and is free to rotate relatively to the axle, so that the action of the differential gearing in the rear axle of the truck, will not be interfered with. When however the truck attachment is to be used for stationary work, a pulley indicated at 62 is mounted on one end of the axle 9', from which pulley the belt or other transmission means is driven. The drive wheel 10' which is mounted directly on the axle 9' is then uncoupled from the axle through proper manipulation of the clutch 59, the other drive wheel 10' is uncoupled from the sleeve 53, and the sleeve and axle are locked together so as to rotate in unison through the medium of the clutch 57. Thus, the axle and sleeve will be driven as a unit and will receive their power from both of the segments of the rear axle of the truck. At the same time the drive wheels 10' will not be rotated, but will act as journals for the axle. In order that the axle and sleeve may be properly lubricated, a suitable oiling means of a common, or some other preferred construction, indicated generally at 63, is provided on each of the wheel hubs.

By using the small wheels in the rear as a propelling medium, depending upon the tension of the belt to hold them to the ground, the natural force of the flow of power through the sprocket chains automatically forces the rear end of the belt to the ground, thereby producing a much greater traction or grip on the ground than has been possible by the use of other means, in proportion to the weight, thus practically overcoming the possibility of the tractor rearing up in front.

I claim:

1. A tractor attachment for a motor vehicle having a driven axle, comprising a frame having an axle mounted thereon, drive wheels journaled on the axle, jack shafts journaled on said frame, sprockets mounted on the drive wheels, smaller sprockets rotatably mounted on the jack shafts, transmission means between the drive wheel sprockets and the smaller sprockets, means for coupling the smaller sprockets with the jack shafts at will, larger sprockets fixed on the jack shafts for rotating the latter, stub axles rotatably mounted on the frame, means for connecting the stub axles with the driven axle of the vehicle for directly driving the stub axles from the driven axle, smaller sprockets mounted on the stub axles, transmission means between the stub axle sprockets and the larger sprockets fixed on the jack shafts, main wheels journaled on the stub axles, and tractor belts running over the said driven wheels and the said main wheels.

2. A tractor attachment for a motor vehicle having a driven axle, comprising a frame, small drive wheels journaled on the frame, stub axles rotatably mounted on the frame, transmission means between the stub axles and the drive wheels for driving said drive wheels, means effecting a coupling of the stub axles with the driven axle of the vehicle whereby the stub axles will be directly driven by said axle, main wheels journaled for rotation upon the stub axles, and tractor belts running over the drive wheels and the main wheels.

3. A tractor attachment for a motor vehicle having a driven axle, comprising a frame having drive wheels mounted thereon, stub axles mounted for rotation relatively to the frame, means for coupling the stub axles with the vehicle axle whereby the stub axles may be driven directly from the vehicle axle, main wheels mounted for rotation relatively to the stub axles, transmission means between the stub axles and the drive wheels, and tractor belts running over the drive wheels and the main wheels.

4. A tractor attachment for a motor vehicle having a driven axle provided with differential drive gearing, comprising stub axles arranged to be directly coupled with the respective ends of the driven axle, a pulley on one of the stub axles, a pair of jack shafts arranged to be driven from the respective stub axles, and means for coupling the jack shafts together to lock the differential gearing and obtain the full driving power of the rear axle at the pulley.

5. A tractor attachment for a motor vehicle having a driven axle provided with differential driving gearing, comprising stub axles arranged to be directly coupled to the respective ends of the driven axle, a pulley mounted on one of the stub axles, a supporting frame, a pair of jack shafts journaled on the frame, means for driving the respective jack shafts from the companion stub axles, and means including a coupling rod for connecting the jack shafts together to lock the differential drive gearing and apply the full power of the driven axle to the pulley.

6. A tractor attachment for a motor vehicle including a frame, stub axles journaled on the frame and arranged to be directly driven from the vehicle axle, main wheels having an independent rotational mounting on the stub axles, drive wheels journaled in the frame, intermediate power transmitting and speed reducing means including a pair of jack shafts journaled on the frame with driving connections to the companion stub axles and drive wheels, and tractor belts applied to the companion main and drive wheels forming the indirect driving connections for the main wheels from the axle driven stub axles.

7. A tractor attachment for a motor vehicle having a driven axle, comprising a pair of stub axles arranged to be attached directly on the respective ends of the driven axle, main wheels mounted for independent rotation on the respective stub axles, drive wheels having a common supporting axle, a pair of intermediate jack shafts, driving means between the stub axles, jack shafts and common shaft respectively, for increasing the power and reducing the speed, and tractor belts applied to the companion main and drive wheels providing the external and indirect driving means for the main wheels from the stub axles.

8. A tractor attachment for a motor vehicle having a driven axle, comprising a stub axle, means for coupling the stub axle directly to the driven axle, a tractor belt, means for driving the tractor belt from the stub axle, a pulley driven by the stub axle, and means for disconnecting the belt driving means whereby the pulley may be driven without driving the tractor belt.

EDWIN G. COX.